United States Patent
Ocke

(10) Patent No.: US 7,454,397 B2
(45) Date of Patent: Nov. 18, 2008

(54) METHOD AND SYSTEM FOR CLASSIFYING PRINT PRODUCT DESCRIPTIONS

(75) Inventor: Kirk John Ocke, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 163 days.

(21) Appl. No.: 11/231,713

(22) Filed: Sep. 21, 2005

(65) Prior Publication Data

US 2007/0094200 A1 Apr. 26, 2007

(51) Int. Cl.
*G06N 5/04* (2006.01)
*B41C 1/00* (2006.01)

(52) U.S. Cl. .......................... 706/47; 700/95; 700/104; 700/117

(58) Field of Classification Search .................. 706/47; 700/95, 104, 117
See application file for complete search history.

(56) References Cited

OTHER PUBLICATIONS

York Graphics (York), "Ink & Ideas" (http://web.archive.org/web/20010302152214/http://inkandideas.com/PrintingGlossary.htm#anchor3010664), 2001.*
Omelayenko, "Integrating Vocabularies: Discovering and Representing Vocabulary Maps", 2002, Springer-Verlag Berlin Heidelberg.*
Ding et al. (Dingl), "GoldenBullet in a Nutshell", 2002, AAAI..*
Adobe et al. (Adobe), "Job Definition Format (JDF)", 2000.*
Ding et al. (DingII), "GoldenBullet: Automated Classification of Product Data in E-commerce", Business Information Systems, Proceedings of BIS, 2002.*

* cited by examiner

*Primary Examiner*—David Vincent
*Assistant Examiner*—Nathan H Brown, Jr.
(74) *Attorney, Agent, or Firm*—Matthew F. Lambrinos; Kermit D. Lopez; Luis M. Ortiz

(57) ABSTRACT

A system and method for classifying a print product description in a print shop vocabulary. Initially, a system of classification having a set of classifications, such as product classes, in a print shop vocabulary is provided in an automated system with classification rules for classifying the product description under a classification. Once the product description is determined, a facts collector in the automated system collects facts concerning classifying the print product. A rules-engine applies the classification rules to the collected facts to classify the product description under at least one classification in accordance with classification rules. The classification(s) under which the product description has been classified is/are then determined. The product description can be classified according to the determined classification(s) as required. A computer program product, when executed by the automated system, causes the automated system to perform the method of classifying the product description in the print shop vocabulary.

16 Claims, 4 Drawing Sheets ered by Pre-Press Personnel. Pre-Press Personnel must be able to understand the JDF file and its content. Once the JDF file is understood, the Pre-Press Personnel can then begin to prepare the file for Digital Printing.

METHOD AND SYSTEM FOR CLASSIFYING PRINT PRODUCT DESCRIPTIONS

TECHNICAL FIELD

Embodiments relate to production printing and, more particularly, to systems and methods of classifying print product descriptions, such as a booklet, in a print shop.

BACKGROUND

Classifying a product description, provided by a customer of a print shop, into the vocabulary (ontology) of the print shop is typically performed in a completely ad-hoc manner. Product description formats, such as JDF Product Intent Nodes, are intended to formalize the description of a product to make translation to a workflow easier. However, classification of print product descriptions is still typically undertaken by manual classification of the formal product description into the print shop vocabulary. In fact, the use of formal product descriptions can even make manual classification more difficult since a person is usually required to interpret the formal product descriptions constructs visually, that is, by reading them. Since such constructs are not typically meant to be human-readable this can be a difficult task and prone to error. Known methods of classifying print product descriptions are therefore based on random or improvised approaches which cannot reliably and accurately provide the most appropriate classification and which, therefore, result in inefficient and time consuming classification of the print product descriptions.

There is a need to provide a methodology of classifying print product descriptions into print shop vocabulary which can make translation of the product description to workflow easier.

The embodiments disclosed herein therefore directly address the shortcomings of known techniques of classifying print product descriptions by providing a methodology which enables print product descriptions to be effectively and rapidly classified into a system of classification.

BRIEF SUMMARY

It is therefore one aspect of the embodiments to provide an improved method for classifying print product descriptions into a system of classification.

It is a further aspect of the embodiments to provide an automated system for classifying print product descriptions into a system of classification.

It is another aspect of the embodiments to provide a method of operating such an automated system for classifying print product descriptions into a system of classification.

It is also another aspect of the embodiments to provide a computer program, which when run on a computer, performs such a method of classifying print product descriptions into a system of classification.

The aforementioned aspects and other objectives and advantages can now be achieved as described herein. In one aspect, a print product description is classified by a method in which a system of classification comprising a set of classifications, such as product classes, is provided for classifying the product description into the print shop vocabulary. Classification rules, consistent with the form of facts, for classifying the product description under a classification of the system of classification, are also provided. A product description of the print product is determined, for example, by acquiring a product description received from a customer of the print shop in the form of a file. Facts concerning classifying the print product are then collected. The classification rules are then applied to the collected facts so as to classify the product description under at least one classification in accordance with the classification rules. Thereafter, the classification(s) under which the product description has been classified is/are determined thereby classifying the product description.

The method of classifying print product descriptions enables a print product description of a print product, as provided by a customer, to be translated to a workflow of a print shop more effectively.

Preferably, the print product description is further classified according to the determined classifications as required.

In another aspect, a method of operating an automated system comprises providing a system of classification in a database of the automated system, the system of classification comprising a set of product classes in a print shop vocabulary, determining a product description of the print product, providing a facts collector in the automated system, loading data representing the product description into the facts collector, the facts collector collecting facts data concerning classifying the product description, providing classification rules, consistent with the form of facts, for mapping the product description to a product class of the system of classification, providing a rules-engine in the automated system for applying the classification rules to the collected facts, loading data representing the classification rules into the rules-engine, loading data representing the collected facts into the rules-engine, executing the rules-engine so as to apply the classification rules to the collected facts and thereby map the product description to at least one product class in accordance with the classification rules, determining the product class(es) to which the product description has been mapped.

The print product descriptions can be in the form of job definition format (JDF) product nodes for describing products and processes used in print shops.

The method can be used to transform JDF Product Nodes to JDF Process Nodes. Automatic/Semi-Automatic transformation of JDF Product Nodes to JDF Process Nodes can substantially reduce the amount of Pre-Press time required to prepare jobs destined for Digital Printers. By reducing Pre-Press labor time, Digital Printers become a more cost effective option and result in more sales of equipment and consumables.

Preferably, the product description can be further classified according to the determined product class(es), if need be.

In yet another aspect, a computer program product comprises: a computer-usable data carrier storing instructions that, when executed by a computer, cause the computer to perform a method of classifying a product description in a print shop vocabulary comprising: providing a system of classification comprising a set of classifications in a print shop vocabulary, determining a product description of a print product, collecting facts concerning classifying the print product, providing classification rules, consistent with the form of facts, for classifying the product description under a classification of the system of classification, applying said classification rules to the collected facts so as to classify the product description under at least one classification in accordance with the classification rules, determining the classification(s) under which the product description has been classified, and further classifying the product description according to said determined classification(s) as required.

BRIEF DESCRIPTION OF THE DRAWINGS

The accompanying figures, in which like reference numerals refer to identical or functionally similar elements throughout the separate views and which are incorporated in and form a part of the specification, further illustrate the embodiment, together with the background, brief summary, and detailed description, serve to explain the principles of the illustrative embodiment.

DETAILED DESCRIPTION

The illustrative embodiment provides an approach to classifying descriptions of a print product, as provided by a customer of a print shop, into a print shop vocabulary (ontology) used for communicating between the product and process so as to translate the print product description to a workflow more effectively.

For the purposes of discussion hereinafter, a "print shop" refers to a grouping of printing resources. The print shop may be a freestanding entity such as a commercial printer or may be part of a corporation or other entity. A "print product" is any product or logical unit of work produced by a print job. For example, a print product can be a booklet, a brochure or a single document. A "print job" refers to work that is to be completed for a customer so as to provide the print product. For example, a request to make 10 copies of a book is a print job. Similarly, a request to make 100 copies of a single document is a print job.

Figure 1:
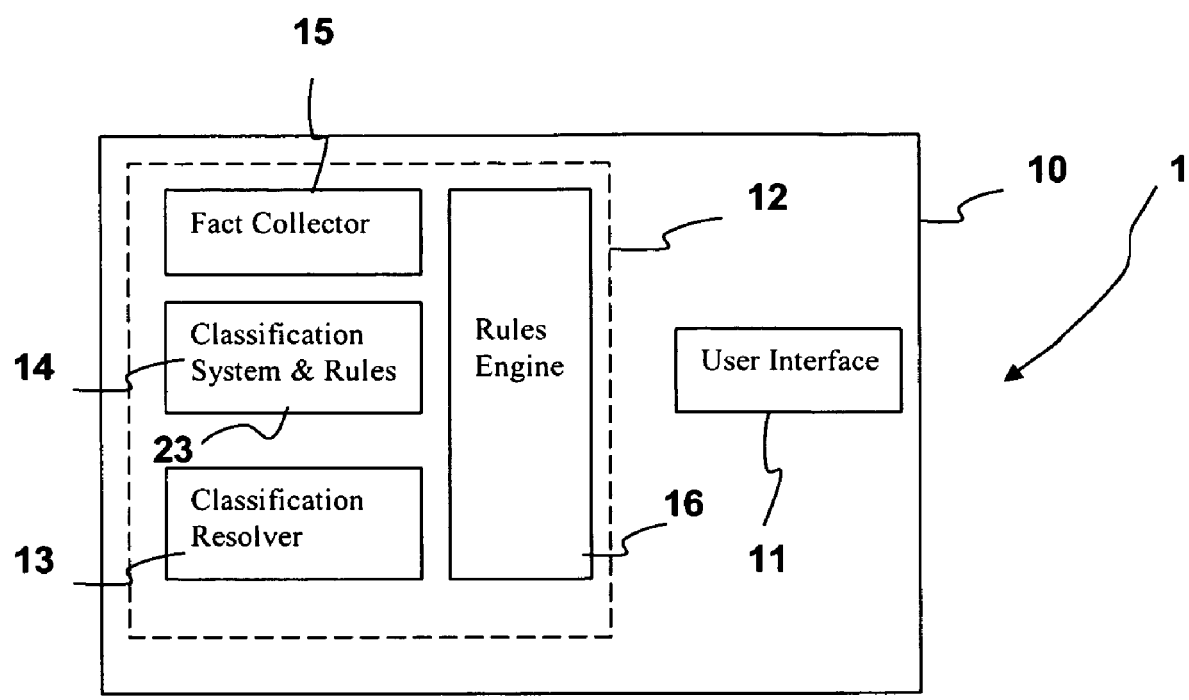
FIG. 1 illustrates a management system implemented on an automated system for classifying a print product description of a print shop into a print shop vocabulary in accordance with an embodiment.

Referring to FIG. 1 of the accompanying drawings, which illustrates an automated system for classifying a print product description provided by a customer of a print shop into the print shop vocabulary, a suitable environment 1 for practicing the illustrative embodiment can be a management system 10 implemented on an electronic automated system, such as a computer operating system. In this example, the automated system is a print production unit 1, such as a digital printer, having a computer integrated therein.

The management system includes a module 12 which is responsible for classifying the print shop descriptions. The module may be hardware, or alternatively, software which may include java code or other types of code. The module can be run locally on the management system, as in the case of the management system of FIG. 1, or run from a remote location via a network coupled to the management system. Those skilled in the art would know that there are multiple modes of implementing such a module.

The management system of FIG. 1 also includes a user interface 11 for allowing a user to input therein a product description 20 of a print product and for updating the classification rules 23 and/or system of classification 14. As will be explained in more detail below, the automated system 1 is operable to classify a product description 20 into a classification, such as a product class 21, such as for example "Booklet" or a "Brochure".

Those skilled in the art would understand that the illustration of FIG. 1 is merely depicting one example of the embodiments and that the embodiments are not limited thereto. For example, the automated system 1 of FIG. 1 need constitute a print production unit 1 having a computer integrated therein, such as in this example, and could instead be a separate system operatively coupled, for example via a data network, to equipment, such as computers, located at the print shops.

A print shop has a vocabulary to describe classifications in the form of product classes. A product class is the aspect of print shop vocabulary (ontology) used to classify a print product, the print shop vocabulary being the specific language used in the print shop for communicating between product and process. A given print shop's vocabulary to describe product classes need not be formalized since the vocabulary can always be formalized. The set of product classes in the vocabulary constitutes the system of classification. The system of classification is defined primarily by the desired final product, such as for example a "Booklet", but can vary depending on the form of manufacture of the final product, such as for example a "BookletWithOfflineFinishing" or a "BookletWithinlineFinishing". The system of classification is not restricted to any particular form. For example, the product classes may all be distinct or exist in a hierarchical structure. Classifications can be in a form other than a product class.

Figure 3:
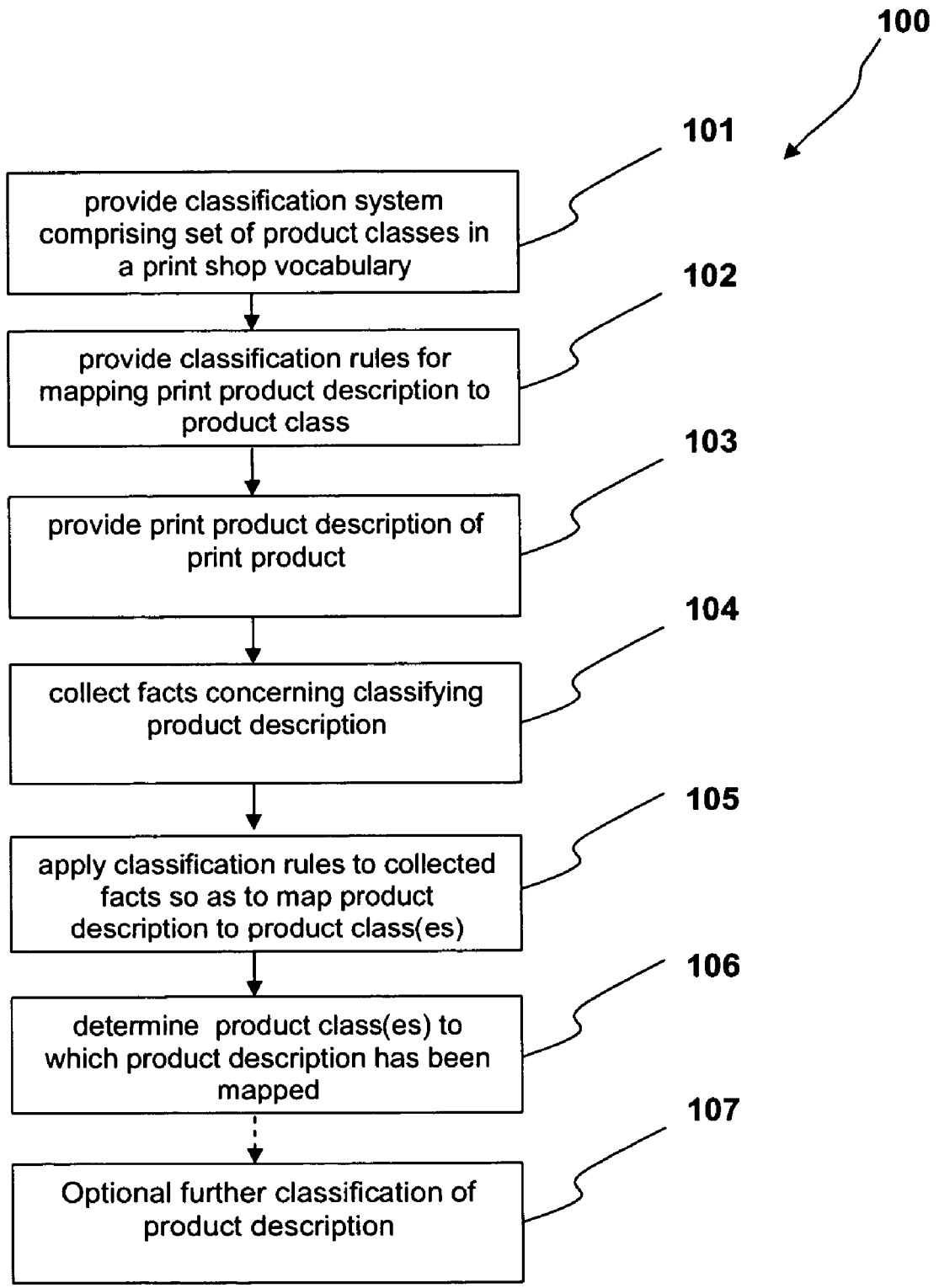
FIG. 3 illustrates a flow-diagram outlining general steps which are performed in classifying the print product description in accordance with an embodiment.

FIG. 3 provides a general overview of the steps performed in the method of classifying print product descriptions under classifications, in this case, product classes, in accordance with an embodiment. As will be described in more detail below, this method can be implemented in an automated system, such as for example, the automated system 1 of the illustrative embodiment of FIG. 1.

Referring to FIG. 3, initially, a system of classification is provided defining a set of product classes in the print shop vocabulary as indicated in step 101. Also, classification rules are provided for mapping the print product description to a product class so as to classify the product description into the system of classification (see step 102). Subsequent to providing the system of classification and rules, the print product description of the print product is provided as indicated in step 103. The print product description describes a print product using a formal unambiguous vocabulary. Further details of methods of translating product descriptions into processing instructions, such as for example transforming JDF product descriptions into a process network, can be found in U.S. patent application Ser. No. 11/121,629, entitled "Transforming a product description into a process network and specifying product creation", filed on May 3, 2005 to Kirk J. Ocke et al, which application is incorporated herein by reference.

The facts relevant to classifying the print product are then collected (see step 104). Facts may, for example, represent aspects of the input components (covers, body blocks, etc . . . ) and the final output component of the product.

Input component facts represent the information relevant to the various components that a finished product is comprised of. For example, FrontCover, Back Cover, Book Block (A.K.A. Body), and Jacket (for hard cover books) are component types represented as input component facts.

An input component fact represents more than just the component type, for example, more than just Front Cover, it also represents all the relevant information about the component. Examples include the Media used, whether the component is one-sided or two-sided, etc . . . .

An output component fact can initially represent only the binding required for the final product (e.g., Saddle Stitched or Perfect Bound).

Preferably, the facts should be of a regular form so as to facilitate easy modification of the rules used to classify the product description but the particular form of the facts is unimportant.

Subsequent to collecting the facts, the classification rules are applied to the collected facts so as to map the product description to the relevant product class thereby classifying the product description in the system of classification as indicated in step 105.

The rules for classification are broken down into two distinct classes, that is, the rules that are excited by the input component facts (multiple facts) and the rules that are excited by the output component fact (just one fact).

When the rules are applied to the collected facts, the input component facts excite those rules and modify the output component fact. For example, if multiple input component facts excite the MediaUsed-Rule rule, then the output component fact is modified to represent the Media Used (e.g., a specific uniform size or that there are multiple media sizes in the final product).

Following application of the classification rules to the collected facts, the product class or classes to which the product description are mapped by application of the rules are then determined as indicated in step 106.

The method of classifying print product descriptions according to steps 101 to 105 enables a print product description of a print product, as provided by a customer, to be translated to a workflow of a print shop more effectively.

Figure 4:
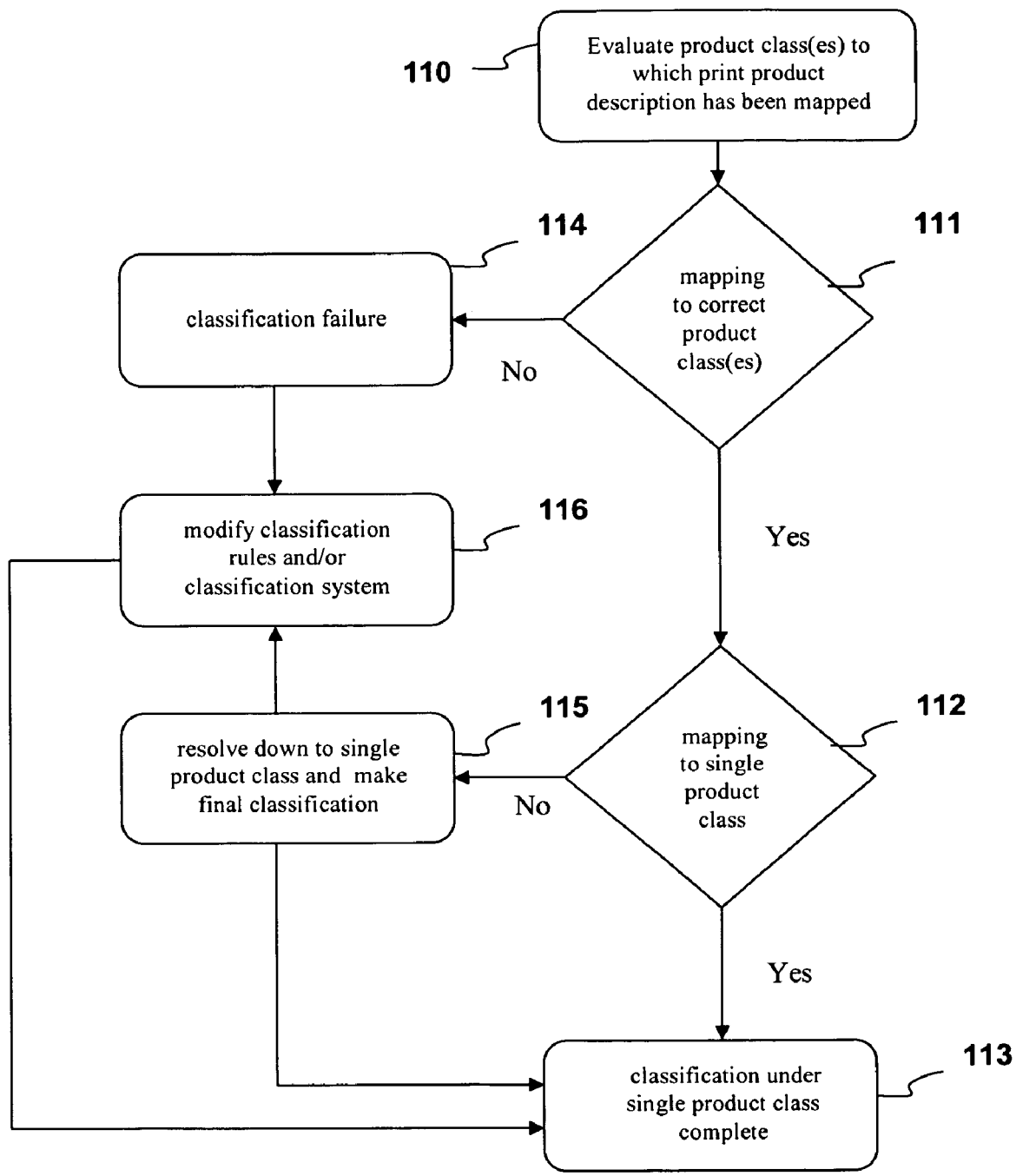
FIG. 4 illustrates a flow-diagram detailing the steps of determining the classification(s) and optionally further classifying the print product description shown in FIG. 3.

Preferably, a final or further classification of the product description under a product class can be subsequently effected, if need be, based on the determined product class(es), as respectively indicated by step 107 of FIG. 3. Referring to FIG. 4, which illustrates in more detail the steps of determining the product class(es) and making the final classification shown in FIG. 3, the product class(es) to which the product description are mapped by application of the rules are initially evaluated to determine if the product description has been successfully mapped to one or more product classes of the system classification (see step 110).

Classification is successful if one or more product classes can be found and mapped to the product description. In the case of the product description being mapped to a single product class, no further classification is necessary as the product description is already classified under the single product class (see steps 112, 113). In the case of the product description being mapped to a plurality of product classes, resolution of the plurality of product classes is required in order to make a final classification of the product description (see steps 112, 115). Alternatively, the classification resolution may not occur until an indeterminate step later in the overall workflow.

There are many situations where multiple classifications may occur for a single product description. This can occur when the system of classification contains intersecting product classes, or when there is either an error or ambiguity in the classification rules used to classify the product description.

If no product classes are found for mapping to the product description, the product description cannot be classified so that classification failure occurs (see step 114 of FIG. 4.) A final or further classification of the product description must be made by classifying the product description under a new product class or an existing product class of the existing system of classification. The final classification can be made by reapplying the classification rules subsequent to updating the classification rules and/or system of classification as will be explained in more detail below. Alternatively, a new product class or an existing product class can be selected so as to make the final classification of the product description.

Preferably, the method of classifying the print product description includes updating the classification rules and/or the system of classification in the event of a classification failure or mapping of the product description to a plurality of product classes so that the product description can be subsequently successfully mapped to the correct product class according to the updated classification rules and/or updated system of classification (see step 116). Updating of the rules requires knowledge of the form of facts to which the classification rules are applied.

Figure 2:
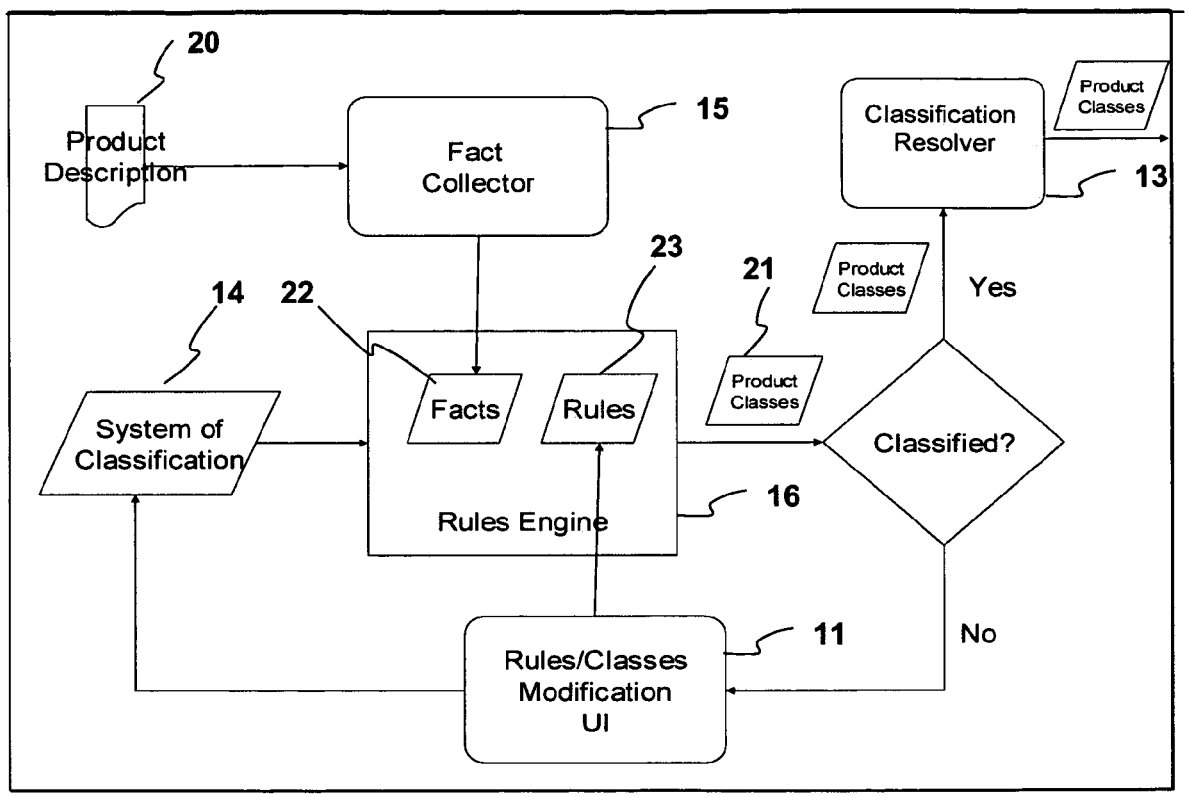
FIG. 2 illustrates a block-diagram of the overall workflow used in classifying the print product description using the automated system of FIG. 1 in accordance with an embodiment.

Referring now to the automated system of FIG. 1 and FIG. 2, which illustrates a block-diagram of the overall workflow used in classifying a print product description 20 using the automated system of FIG. 1 in accordance with an embodiment, the module 12 includes a system of classification 14 together with classification rules 23 used to classify a product description 20 into the system of classification, a facts collector 15 for collecting facts 22 concerning classifying the product description 20, a rules-engine 16 for applying the classification rules 23 to the collected facts 22, and a classification resolver 13 for resolving down multiple classifications.

A method of operating the automated system 1 of the illustrative embodiment of FIG. 1 in order to implement the method of classifying print product descriptions under product classes will now be described with reference to the accompanying figures.

Referring to FIGS. 1 & 2, providing the system of classification (step 101 of FIG. 3) is achieved by installing the module 12, including a system of classification 14 comprising a set of product classes 21 on part of the module 12, on the automated system. Alternatively, the system of classification could be installed separately from the module 12 if need be. The system of classification is simply those products that can be created by the print shop, varied by specific production methods for producing the print product. Examples of classes in the System of Classification of this embodiment are "Booklet", "BookletWithPrePressImposition", "BookletWithPrinterImposition".

The step of providing classification rules (step 102 of FIG. 3) is also implemented by installing the module 12 since the module includes the classification rules 23.

Product descriptions in the form of files can be received from customers of the print shop. A user enters, by means of the user interface 11, the product description 20 for the relevant print product into the management system 10 thereby implementing step 103 of FIG. 3. In the illustrative embodiment of FIG. 1, the product description 20 is in the form of a product node of job definition format (JDF), JDF being a formal language that describes both products and the processes required for creating products and, more specifically, describes products and processes used in print shops. A JDF product node is a formal, rigorous, description of a product such as a Book, Business Card or Brochure. However, as already indicated above, the print product description can be any formal unambiguous vocabulary which describes the print product.

Those skilled in the art would understand that the JDF product node or other product description 20 could also be determined and entered into the management system 10 by automated means, such as for example, by means of a scanner, operatively coupled to the management system, automatically scanning encoded markers, such as bar codes, associated with the print product.

Collecting facts (step 104 of FIG. 3) is performed by means of the management system 10 passing or loading the product description 20, in the form of the JDF product node, in the fact collector 15 and then the fact collector examining the loaded product description 20 and creating facts concerning the input components that make up the final product (see FIG. 2). The facts are of a form used by the classification rules 23 that classify the product description. The facts related to the input components in this example include: Media dimensions, color model, and number of reader pages. Additionally the binding required on the final product is also collected as an output component fact.

Applying the classification rules, as indicated in step 105 of FIG. 3, is achieved by loading the collected facts 22 from the facts collector 15 into the rules-engine 16 so as to assert the facts 22 within the rules engine, loading the classification rules 23 into the rules-engine and then executing or running the rules-engine (see FIG. 2). The rules engine makes its classification based on the final state of the output component facts, which are modified by rules firing regarding the input component facts. An example of the rules-engine functions and the form of the rules is provided in Appendix I hereinafter. The module 12 determines the product class(es) to which the product description 20 has been mapped and thereby classified by the rules-engine.

The method implemented on the automated system 1 of FIG. 1 can be used in conjunction with methods of transforming product descriptions into process networks, such as for example the method described in the above referenced U.S. patent application Ser. No. 11/121,629, to transform JDF Product Nodes to JDF Process Automatic/Semi-Automatic transformation of JDF Product Nodes to JDF Process Nodes can substantially reduce the amount of Pre-Press time required to prepare jobs destined for Digital Printers. By reducing Pre-Press labor time, Digital Printers become a more cost effective option and result in more sales of equipment and consumables.

Preferably, the automated system 1 is able to perform, if need be, the step of making a further or final classification of the product description (step 107 of FIG. 3). In cases such as where multiple classifications are deduced by the rules-engine 16 a resolution to a single product class may need to be made (see general steps 111, 112 & 115 of FIG. 3). For example, if two classifications are determined, namely, "BookletWithPrePressImposition", "BookletWithPrinterImposition", both product classes 21 are returned, so the JDF Product Node is classified, but resolution of the classification is preferable in order to make a final classification. Resolution is effected by the classification resolver 13 which can be any mechanism capable of resolving down the product classes to a single product class (see FIG. 2). For example, the classification resolver 13 can be the user interface 11 operable by the user to resolve the classifications. The two possible product classes 21 can be displayed to the user at the user interface 11, where the user selects the required product class, in this case, the "BookletWithPrinterImposition". The classification resolver may instead be part of the module 12 and use heuristics to automatically resolve down to a single product class.

In order to implement step 116 of FIG. 3, the classification rules 23 are updated by means of the user interface 11 which allows the user to add, modify and remove rules 23 consistent with the form of the facts 22 as indicated in FIG. 2. A formal ontology or other suitable mechanism, such as for example a parser that validates the form of rules 23, is used to ensure a rigorous representation of the rules that are added or modified. Although a formal ontology is used, no particular presentation form of the user interface 11 is necessary. Updating of the system of classification is handled in a manner similar to the modification of rules. The user interface 11 allows the user to add, modify and remove product classes from the system of classification. Modifications must be consistent with how the rules use the system of classification, for example, if the product classes in the system of classification are simply keyword values, then adding a new product class means adding a new keyword.

In the case of a classification failure (see step 114 of FIG. 3), the user interface 11 provides a simple representation of the output component facts so that the user can observe a mistake in the pattern of the output component facts used to classify "Booklets." Specifically, the existing rule 23 tries to match against a binding value of CornerStitch, instead of SaddleStitch. The user modifies the rule 23 to match against the correct binding value of SaddleSticth, which causes an updated set of rules to be created for use in subsequent classifications. Alternatively, the user can be notified at the user interface 11 of the classification failure and, in response, can enter a new product class or select an existing product class 21 so as to make the final classification of the product description.

Those skilled in the art would also understand that a module can also be added to the management system for the purpose of automatically updating the classification rules 23 and/or system of classification 14 rather than updating by means of the user interface 11.

It will be appreciated that variations of the above-disclosed and other features, aspects and functions, or alternatives thereof, may be desirably combined into many other different systems or applications.

Also, it will be appreciated that various presently unforeseen or unanticipated alternatives, modifications, variations or improvements therein may be subsequently made by those skilled in the art which are also intended to be encompassed by the following claims.

APPENDIX 1

Input Component Fact description:

Input Component Fact = (ComponentType, MediaDimensions,
ColorModel,
ReaderPages)
where,
ComponentType: one of FrontCover, BackCover, Body
MediaDimensions = dimensions of the media
ColorModel = monochrome or full color
ReaderPages = number of reader pages in this component
NumberUp = number of reader pages per sheet
Sides = one of Onesided, TwoSided.

APPENDIX 1-continued

Output Component Fact description:

Output Component Fact = (Binding, MediaDimensions, ColorModel, Cover, Total Sheets, ComponentCount)
where,
Binding: values such as SaddleStitch, Loose, HardCover, SoftCover, . . .
MediaDimensions = dimensions of the media for the entire product, or Mixed
ColorModel = monochrome or full color
Cover = whether or not the final product has covers
TotalSheets = total number of sheets used for one copy of the final product
ComponentCount = number of input components in product description Rules:

```
NewInputComponent-Rule -->
Conditions: a new InputComponent Fact is asserted
Salience: always fires before rules that work on the Output
Component
Consequences:
// increment the total sheets of the output component based
// on what this input component adds to it.
outputComponentFact.incrementComponentCount(inputComponentFact.getReader
Pages( ));
// increment the total sheets of the output component based
// on what this input component adds to it.
outputComponentFact.incrementTotalSheets(inputComponentFact.getReaderPages( ));
// Now set the output component color model. If the output component doesn't
// yet have a color model just set it, if it does then set it to Mixed if
// this input component doesn't match the current output component value.
if (inputComponent.getColorModel( ) != null) {
if (outputComponent.getColorModel( ) == null) {
outputComponent.setColorModel(inputComponent.getColorModel( ));
}
else if
(!outputComponent.getColorModel( ).equals(inputComponent.getColorModel( ))
) {
outputComponent.setColorModel("Mixed");
}
}
// Now set the output component Media dimensions. If the output component doesn't
// yet have Media dimensions just set it, if it does then set it to Mixed if
// this input component doesn't match the current output component value.
if (inputComponent.MediaDimensions( ) != null) {
if (outputComponent.getMediaDimensions( ) ==
null) {
outputComponent.setMediaDimensions(inputComponent.getMediaDimensions( );
}
else if
(!outputComponent.getMediaDimensions( ).equals(inputComponent.MediaDimensions( ))) {
outputComponent.setMediaDimensions("Mixwd");
}
}
```

What is claimed is:

1. A computer-implemented method for a print shop comprising:
   providing a system of classification comprising a set of classifications in a print shop vocabulary of print products that can be created by a print shop, varied by specific production methods for producing the print products,
   receiving a product description of a print product,
   collecting facts concerning classifying said product description,
   providing classification rules, consistent with the form of facts, for classifying said product description under a classification of said system of classification,
   applying said classification rules to said collected facts so as to classify said product description under at least one classification of a print product that can be created by said print ship in accordance with said classification rules,
   determining the classification(s) under which said product description has been classified;
   updating said classification rules and/or said system of classification in response to inconclusive or incorrect classifying of said product description under a classification and/or in response to multiple classifying of said product description under a plurality of classifications such that subsequently applying said updated classification rules and/or said updated system of classification to said collected facts successfully classifies said product description into the print shop vocabulary under a single classification of a print product that can be created by said print shop; and translating said print product description in said print shop vocabulary to a process network, said process network being a set of processing instructions that when executed in the order specified by the process network result in the print product.

2. The method of claim 1, further comprising further classifying said product description according to said determined classification(s).

3. The method of claim 2, wherein applying said classification rules to said collected facts classifies said product description under a plurality of classifications, and wherein further classifying said product description comprises resolving said plurality of determined classifications down to a single classification.

4. The method of claim 1, wherein updating said classification rules comprises adding, modifying and/or removing at least one classification rule consistent with the form of said facts, and validating the form of said added or modified classification rule(s).

5. The method of claim 1, wherein updating said system of classification comprises, adding, modifying and/or removing at least one classification or other print shop vocabulary in a form consistent with said classification rules.

6. The method of claim 2, wherein further classifying said product description comprises selecting a classification of said system of classification, or a classification other than a classification of said system of classification, in response to inconclusive or incorrect classifying of said product description under a classification and/or in response to multiple classifying of said product description under a plurality of classifications of said system of classification.

7. A method of operating an automated system for a print shop, the method comprising providing a database having a system of classification in said automated system, said system of classification comprising a set of product classes in a print shop vocabulary of print products that can be created by the print shop, varied by specific production methods for producing the print products, receiving a product description of a print product, providing a facts collector in said automated system, loading data representing said product description into said facts collector, said facts collector collecting facts data concerning classifying said product description, providing classification rules in said automated system, consistent with the form of facts, for mapping said product description to a product class of a print product that can be created by said print shop, providing a rules-engine in said automated system for applying said classification rules to said collected facts, loading data representing said classification rules into said rules-engine, loading data representing said collected facts into said rules-engine, executing said rules-engine so as to apply said classification rules to said collected facts and thereby map said product description to at least one product class of a print product that can be created by said print shop in accordance with said classification rules, determining the product class(es) of a print product that can be created by said print shop to which said product description has been mapped, updating said classification rules and/or said system of classification in response to inconclusive or incorrect classifying of said product description under a classification and/or in response to multiple classifying of said product description under a plurality of classifications such that subsequently applying said updated classification rules and/or said updated system of classification to said collected facts successfully classifies said product description into the print shop vocabulary under a single classification of a print product that can be created by said print shop, wherein said product description comprises Job Definition Format (JDF) product nodes; and translating said JDF product nodes in said print shop vocabulary to a process network, said process network being a set of processing instructions that when executed in the order specified by the process network result in the print product.

8. The method of claim 7, further comprising further classifying said product description according to said determined product class(es).

9. The method of claim 7, wherein said classification resolver comprises a user interface or a module operable to resolve said plurality of product classes down to a single product class.

10. The method of claim 7, further comprising providing a notification at a user interface provided in said automated system in response to inconclusive or incorrect mapping of said product description and/or in response to multiple mapping of said product description to a plurality of product classes of said system of classification, and wherein further classifying said product description according to said determined product class(es) comprises said user selecting, at said user interface, a product class of said system of classification, or a product class other than a product class of said system of classification.

11. The method of claim 7, further comprising providing a notification at a user interface provided in said automated system in response to inconclusive or incorrect mapping of said product description and/or in response to multiple mapping of said product description to a plurality of classifications, and wherein updating said classification rules comprises said user adding, modifying and/or removing, at said user interface, at least one classification rule consistent with the form of said facts, and validating the formal ontology of said added or modified classification rule(s).

12. The method of claim 7, further comprising providing a notification at a user interface provided in said automated system in response to said inconclusive, incorrect and/or in response to multiple mapping of said product description to at least one product class, wherein updating said system of classification comprises said user adding, modifying and/or removing, at said user interface, at least one product class or other print shop vocabulary in a form consistent with said classification rules.

13. The method of claim 8, further comprising providing a classification resolver in said automated system, wherein executing said rules-engine maps said product description to a plurality of product classes, and wherein further classifying said product description comprises resolving said plurality of product classes down to a single product class using said classification resolver.

14. The method of claim 11, further comprising a validator provided in said automated system, said validator being operable to validate said formal anthology of said added or modified classification rules.

15. A computer program product comprising: a computer-usable data carrier storing instructions that, when executed by a computer, cause the computer to perform a method for a print shop comprising:

providing a system of classification comprising a set of classifications in a print shop vocabulary of print products that can be created by a print shop, varied by specific production methods for producing the print products, determining a product description of a print product, collecting facts concerning classifying said product description, providing classification rules, consistent with the form of facts, for classifying said product description under a classification of a print product that can be created by said print shop, applying said classification rules to said collected facts so as to classify said product description under at least one classification of a print product that can be created by said print shop in accordance with said classification rules, determining the classification(s) of a print product under which said product description has been classified, updating said classification rules and/or said system of classification in response to inconclusive or incorrect classifying of said product description under a classification and/or in response to multiple classifying of said product description under a plurality of classifications such that subsequently applying said updated classification rules and/or said updated system of classification to said collected facts successfully classifies said product description under a single classification of a print product that can be created by said print shop; and translating said print product description in said print shop vocabulary to a process network, said process network being a set of processing instructions that when executed in the order specified by the process network result in the print product.

16. The computer program of claim 1, wherein applying said classification rules to said collected facts classifies said product description under a plurality of classifications, and wherein further classifying said product description comprises resolving said plurality of determined classifications down to a single classification.

* * * * *